F. F. SORENSEN.
ROLLER BEARING.
APPLICATION FILED JULY 26, 1919.
1,354,922.
Patented Oct. 5, 1920.
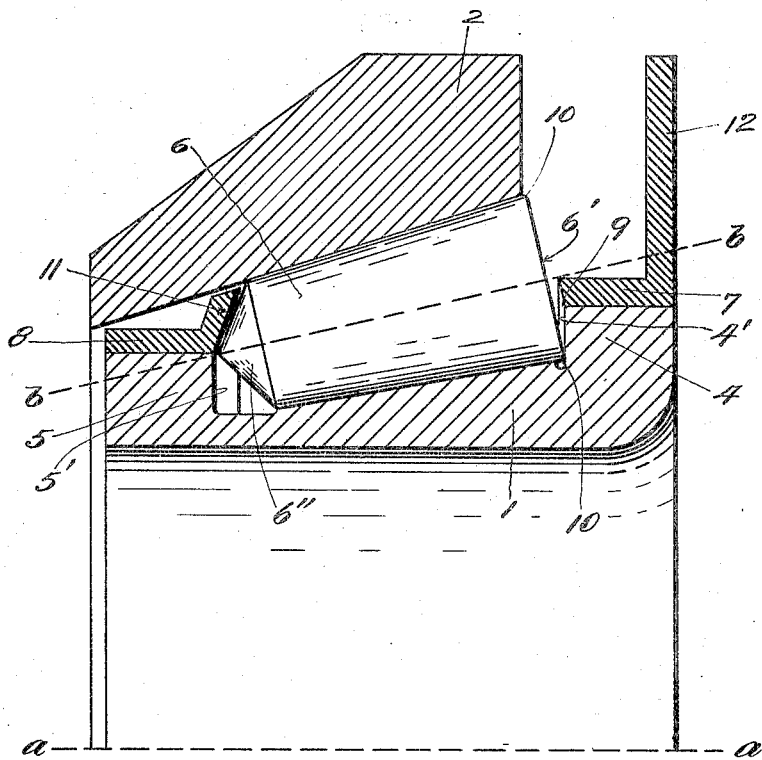
INVENTOR.
Frank F. Sorensen.
BY
William J. Jackson
ATTORNEY.

UNITED STATES PATENT OFFICE.

FRANK F. SORENSEN, OF PHILADELPHIA, PENNSYLVANIA, ASSIGNOR, BY MESNE ASSIGNMENTS, OF THREE-FIFTHS TO VACCUMETER SELLING COMPANY, OF PHILADELPHIA, PENNSYLVANIA, A CORPORATION OF DELAWARE.

ROLLER-BEARING.

1,354,922.     Specification of Letters Patent.      Patented Oct. 5, 1920.

Application filed July 26, 1919. Serial No. 313,649.

*To all whom it may concern:*

Be it known that I, FRANK F. SORENSEN, a citizen of the United States, residing at the city of Philadelphia, county of Philadelphia, and State of Pennsylvania, have invented certain new and useful Improvements in Roller-Bearings, of which the following is a specification.

This invention has relation to the style of roller bearing shown and described in U. S. Letters Patent #986,453 and has for its leading object to so improve the structure of such type of bearing as to enhance the commercial value thereof. Other and further objects relate to the provision of general details of construction and to the arrangement and combination of parts for attaining the advantages sought by the leading object.

The invention will be claimed at the end hereof but will be first described in connection with the embodiment of it chosen from other embodiments for the sake of illustration in the accompanying drawings, in which there is shown principally in section, one-half of a roller bearing embodying features of the invention.

In the drawings 1 and 2 designate inner and outer rings arranged one within the other and they are concentric in respect to the common axis $a$—$a$. The adjacent faces of such rings are properly inclined with respect to the common axis $a$—$a$ to form a race-way for accommodating a circle of conical or taper-bearings. One of these rings, in the present instance the inner ring, is provided with a pair of spaced shoulders 4 and 5. The inner faces 4'—5' of these shoulders are disposed at right angles to the axis $a$—$a$. 6 designates one of a circle of tapered rollers the larger or inner end of which is flat as at 6' and is disposed at right angles to the axis $b$—$b$. The smaller or outer-end of such roller is of substantially conical configuration as at 6''. Fixed upon the shoulders 4 and 5 are annular members 7 and 8 which function as retaining means for the roller. Of these members that designated 7 is provided with a beveled portion 9 the plane of which parallels the plane of the roller face 6'. The beveled portion extends beyond the inner face of shoulder 4 so that while the flat end of a roller revolves free thereof a roller is retained against removal from the race-way thereby. It is to be noted that the peripheral edge 10 of a roller is the only point of contact at its flat end and that such contact point is with the flat inner face of shoulder 4. The member 8 is beveled as at 11 which bevel extends beyond the flat face of shoulder 5 and serves as a bearing surface for the tapered end of a roller. The member 7 may if desired be shaped and proportioned as shown at 12 in the drawings to function as a dust excluder. The part 12 comprises an annular flanged portion of a diameter substantially equal to the greatest diameter of outer ring 2.

Experience demonstrates that a bearing constructed in the manner described is not only comparatively inexpensive to manufacture but is efficient in practice and commercially considered overcomes all the objectionable features present in the type of bearing before alluded to.

What I claim is:—

1. A roller bearing comprising the combination of inner and outer rings having opposed taper roller races whereof one is provided with a pair of spaced shoulders the inner face of each of which is flat and is formed at right angles to the bearing axis, a circle of taper rollers each having one flat end and a substantially conical end arranged between said races and between said shoulders, the peripheral edge of a roller having a one point contact with the flat face of a shoulder and retaining rings having beveled ends fixed with respect to said shoulders, a beveled portion being projected beyond a flat face of a shoulder.

2. A roller bearing as described in claim 1, characterized by the outermost retaining ring being provided with an annular flanged portion of a diameter substantially equaling the greatest diameter of said outer ring.

FRANK F. SORENSEN.